(12) United States Patent
Fukunaga et al.

(10) Patent No.: US 12,181,108 B2
(45) Date of Patent: Dec. 31, 2024

(54) HYDROGEN GAS FILLING METHOD AND HYDROGEN GAS FILLING DEVICE

(71) Applicant: ENEOS Corporation, Tokyo (JP)

(72) Inventors: Akihiko Fukunaga, Tokyo (JP);
Tatsuya Rembutsu, Shizuoka (JP);
Koki Sakamoto, Shizuoka (JP)

(73) Assignee: ENEOS CORPORATION, Tokyo (JP)

( * ) Notice: Subject to any disclaimer, the term of this patent is extended or adjusted under 35 U.S.C. 154(b) by 135 days.

(21) Appl. No.: 17/732,049

(22) Filed: Apr. 28, 2022

(65) Prior Publication Data

US 2022/0260209 A1 Aug. 18, 2022

Related U.S. Application Data

(63) Continuation of application No. 17/097,469, filed on Nov. 13, 2020, now Pat. No. 11,346,503, which is a
(Continued)

(30) Foreign Application Priority Data

May 29, 2018 (JP) .................................. 2018-102762

(51) Int. Cl.
*F17C 13/02* (2006.01)
*B67D 7/04* (2010.01)
(Continued)

(52) U.S. Cl.
CPC ................ *F17C 5/007* (2013.01); *B67D 7/04* (2013.01); *B67D 7/32* (2013.01); *F17C 5/06* (2013.01);
(Continued)

(58) Field of Classification Search
CPC .......... F17C 5/007; F17C 5/06; F17C 13/026; F17C 2221/012; F17C 2227/0157;
(Continued)

(56) References Cited

U.S. PATENT DOCUMENTS

2012/0205003 A1 8/2012 Okawachi
2013/0268130 A1 10/2013 Adler et al.
(Continued)

FOREIGN PATENT DOCUMENTS

CN 103003616 3/2013
CN 102575808 7/2014
(Continued)

OTHER PUBLICATIONS

Jun. 25, 2019 International Search Report issued in International Patent Application No. PCT/JP2019/020894.
(Continued)

*Primary Examiner* — Jason K Niesz
(74) *Attorney, Agent, or Firm* — GREENBLUM & BERNSTEIN, P.L.C.

(57) ABSTRACT

A hydrogen gas filling device includes a reception circuit, a difference calculation circuit, a filling speed calculation circuit, an accumulator, and a filing machine. The reception circuit is configured to receive, from a vehicle equipped with a tank to be filled with hydrogen gas and powered by the hydrogen gas, a value of a parameter of the vehicle. The difference calculation circuit is configured to calculate a difference between a predetermined value and the value of the parameter received from the vehicle. The filling speed calculation circuit is configured to calculate a filling speed of the hydrogen gas depending on the difference. The accumulator is configured to accumulate hydrogen gas. The filling machine is configured to fill the tank with the hydrogen gas from the accumulator at the calculated filling speed. A hydrogen gas filling method includes the operations noted above.

16 Claims, 7 Drawing Sheets

Related U.S. Application Data continuation of application No. PCT/JP2019/020894, filed on May 27, 2019.

(51) Int. Cl.
| | | |
|---|---|---|
| *B67D 7/32* | (2010.01) | |
| *F17C 5/00* | (2006.01) | |
| *F17C 5/06* | (2006.01) | |
| *G01K 3/08* | (2006.01) | |
| *G01L 19/00* | (2006.01) | |

(52) U.S. Cl.
CPC .............. *F17C 13/026* (2013.01); *G01K 3/08* (2013.01); *G01L 19/0092* (2013.01); *F17C 2221/012* (2013.01); *F17C 2227/0157* (2013.01); *F17C 2227/0355* (2013.01); *F17C 2250/0439* (2013.01); *F17C 2250/0636* (2013.01); *F17C 2270/0168* (2013.01)

(58) Field of Classification Search
CPC ...... F17C 2227/0355; F17C 2250/0439; F17C 2250/0636; F17C 2270/0168; B67D 7/04; B67D 7/32; G01K 3/08; G01L 19/0092
See application file for complete search history.

(56) References Cited

U.S. PATENT DOCUMENTS

| | | |
|---|---|---|
| 2014/0196814 A1 | 7/2014 | Nagura et al. |
| 2014/0202584 A1* | 7/2014 | Mathison .................. F17C 5/06 141/4 |
| 2014/0311622 A1 | 10/2014 | Cohen |
| 2015/0377416 A1 | 12/2015 | Miyoshi et al. |
| 2016/0305611 A1 | 10/2016 | Handa |
| 2019/0086032 A1 | 3/2019 | Handa |

FOREIGN PATENT DOCUMENTS

| | | |
|---|---|---|
| CN | 105318184 | 2/2016 |
| JP | 2013-538320 A | 10/2013 |
| JP | 5387846 | 1/2014 |
| JP | 2014-192048 | 10/2014 |
| JP | 2015-169325 A | 9/2015 |
| JP | 2015-197700 A | 11/2015 |
| JP | 2017-57871 | 3/2017 |
| JP | 2017-137929 A | 8/2017 |
| WO | 2017/159314 A1 | 9/2017 |
| WO | 2018/136508 | 7/2018 |

OTHER PUBLICATIONS

Dec. 10, 2020 Form PCT/IB/338, Notification of Transmittal of Translation of the International Preliminary Report on Patentability of the original International Patent Application No. PCT/JP2019/020894, Form PCT/IB/373, International Preliminary Report on Patentability, which contains PCT/ISA/237, Written Opinion of the International Searching Authority.
Sep. 9, 2021 Australian Office Action in corresponding Australian Application No. 2019278632.
Nov. 2, 2021 Japanese Office Action issued for the Japanese counterpart application No. 2018-102762, along with its English machine translation.
Oct. 9, 2021 Chinese Office Action for Chinese counterpart application No. 201980036021.X.
Feb. 7, 2022 Extended European Search Report (EESR) issued in corresponding European Application No. 19811927.3.
Australian First Examination Report issued on Jan. 19, 2024 in corresponding Australian Application No. 2022259714.
Australian Second Examination Report issued on Jun. 12, 2024 for the Australian counterpart Divisional application No. 2022259714.
Nov. 20, 2024 Extended European Search Report in corresponding European Patent Application No. 24194365.3.

* cited by examiner

Coefficient Table

| H₂ Temp. | a | b | c |
|---|---|---|---|
| −20 | −0.0182 | 1.5274 | 50.568 |
| −23 | ~ | ~ | ~ |
| −26 | ~ | ~ | ~ |
| −29 | ~ | ~ | ~ |
| −32 | ~ | ~ | ~ |
| −35 | ~ | ~ | ~ |
| −38 | ~ | ~ | ~ |

HYDROGEN GAS FILLING METHOD AND HYDROGEN GAS FILLING DEVICE

CROSS-REFERENCE TO RELATED APPLICATION

The present application is a continuation of U.S. patent application Ser. No. 17/097,469 filed Nov. 13, 2020, which is a continuation of International Patent Application No. PCT/JP2019/020894 filed May 27, 2019, which claims the benefit of Japanese Patent Application No. 2018-102762 filed May 29, 2018. The disclosure of each of the above-noted applications is expressly incorporated herein by reference in its entirety.

BACKGROUND OF THE INVENTION

Field of the Invention

The present invention relates to a hydrogen gas filling method and a hydrogen gas filling device, for example, a hydrogen gas filling method and a hydrogen gas filling device for a vehicle powered by hydrogen gas at a hydrogen station.

Related Art

As fuel for vehicles, in addition to conventional fuel oils such as gasoline, recently, hydrogen fuel has attracted attention as a clean energy source. As a result, fuel cell vehicles (FCVs) powered by the hydrogen gas have been developed. In order to popularize the fuel cell vehicle (FCV), it is necessary to expand hydrogen stations capable of rapidly filling the fuel cell vehicle with the hydrogen gas. At the hydrogen station, in order to rapidly fill the FCV with the hydrogen gas, a multi-stage accumulator including a plurality of accumulators for accumulating the hydrogen fuel compressed to a high pressure by a compressor is disposed. By performing filling via a dispenser (measuring machine) while switching the accumulator to be used, a differential pressure between a pressure inside the accumulator and a pressure of a fuel tank of the FCV is greatly maintained, and the FCV is rapidly filled with the hydrogen gas by the differential pressure from the accumulator to the fuel tank (for example, refer to JP-A-2015-197700).

Here, in the case of filling the hydrogen gas at the hydrogen station, a filling time until full filling is estimated by a simulation with a large margin in advance for an actual temperature increase of the fuel tank so that the temperature of the fuel tank of the FCV does not become a high temperature, by using the hydrogen gas that is cooled enough to prevent the supply temperature of the hydrogen gas from increasing. Then, a filling speed is determined according to the estimated filling time. Therefore, the determined filling speed is generally set lower as compared with the actual filling capacity of the hydrogen station. Therefore, a wasted filling time is required. Further, in order to prevent the supply temperature of the supplied hydrogen gas from increasing, a cooler (precooler) in the dispenser is constantly supplied with a refrigerant from a refrigerator, and the hydrogen gas is cooled to, for example, −40° C. Therefore, a large amount of electric power is required to circulate the refrigerant.

BRIEF SUMMARY OF THE INVENTION

According to one aspect of the present invention, a hydrogen gas filling method includes receiving, from a vehicle equipped with a tank to be filled with hydrogen gas and powered by the hydrogen gas, a temperature of the tank before a start of filling;

calculating a difference between a preset maximum temperature and the temperature of the tank;

calculating a filling speed of the hydrogen gas depending on the difference; and filling the hydrogen gas from an accumulator in which the hydrogen gas is accumulated into the tank at the filling speed calculated via a measuring machine.

According to another aspect of the present invention, a hydrogen gas filling device includes a reception circuit configured to receive, from a vehicle equipped with a tank to be filled with hydrogen gas and powered by the hydrogen gas, a temperature of the tank before a start of filling;

a difference calculation circuit configured to calculate a difference between a preset maximum temperature and the temperature of the tank;

a filling speed calculation circuit configured to calculate a filling speed of the hydrogen gas depending on the difference;

an accumulator configured to accumulate hydrogen gas; and a measuring machine configured to fill hydrogen gas from the accumulator into the tank at the filling speed calculated.

DETAILED DESCRIPTION OF THE INVENTION

Embodiments below describe a method and a device capable of filling hydrogen gas at a filling speed where an extra margin is eliminated, in a case that the hydrogen gas is filled.

First Embodiment

Figure 1:
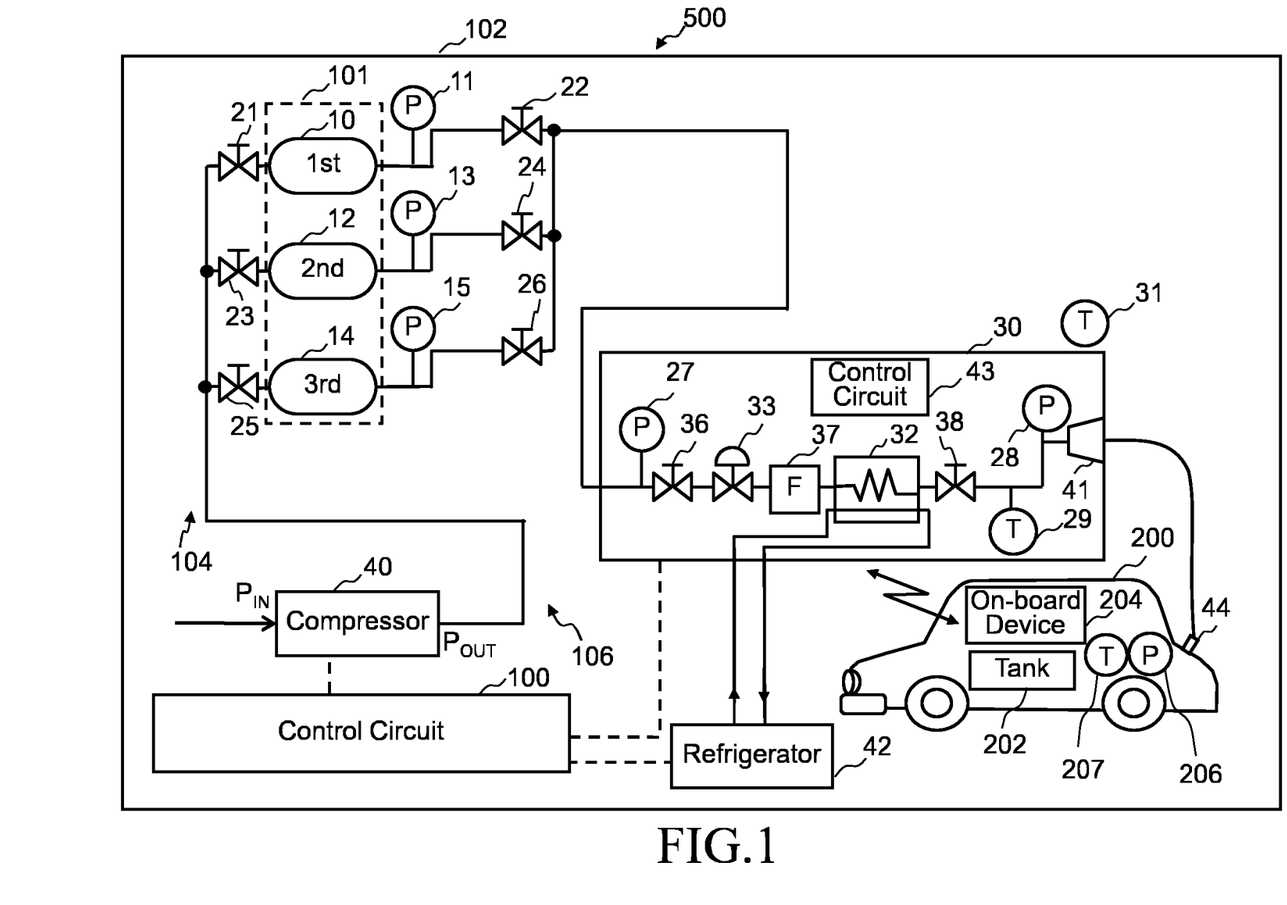
FIG. 1 is an example of a configuration diagram showing a configuration of a hydrogen filling system of a hydrogen station in a first embodiment.

FIG. 1 is an example of a configuration diagram showing a configuration of a hydrogen filling system of a hydrogen station in a first embodiment. In FIG. 1, a hydrogen filling system 500 is disposed in a hydrogen station 102. The hydrogen filling system 500 includes a multi-stage accumulator 101, a dispenser (measuring machine) 30, a compressor 40, a refrigerator 42, and a control circuit 100. The multi-stage accumulator 101 includes a plurality of accumulators 10, 12, and 14 in which a use lower limit pressure is set to multiple levels.

In the example of FIG. 1, the three accumulators 10, 12, and 14 configure the multi-stage accumulator 101. In the example of FIG. 1, for example, the accumulator 10 functions as a 1st bank having a low use lower limit pressure. The accumulator 12 functions as a 2nd bank having an intermediate use lower limit pressure, for example. The accumulator 14 functions as a 3rd bank having a high use lower limit pressure, for example. However, the present invention is not limited thereto. The accumulators used in the 1st bank to the 3rd bank are replaced as needed.

In the hydrogen station 102, a curdle, an intermediate accumulator, and/or a hydrogen production apparatus (not shown) are also disposed. Further, a hydrogen trailer (not shown) for filling and delivering hydrogen gas arrives at the inside of the hydrogen station 102.

Further, in FIG. 1, the suction side of the compressor 40 is connected to the curdle, the intermediate accumulator, the filling tank of the hydrogen trailer, or the hydrogen production apparatus described above by a pipe.

The discharge side of the compressor 40 is connected to the accumulator 10 via a valve 21 by a pipe. Similarly, the discharge side of the compressor 40 is connected to the accumulator 12 via a valve 23 by a pipe. Similarly, the discharge side of the compressor 40 is connected to the accumulator 14 via a valve 25 by a pipe.

Further, the accumulator 10 is connected to the dispenser 30 via a valve 22 by a pipe. Further, the accumulator 12 is connected to the dispenser 30 via a valve 24 by a pipe. Further, the accumulator 14 is connected to the dispenser 30 via a valve 26 by a pipe. As such, the dispenser 30 is commonly connected to the accumulators 10, 12, and 14 configuring the multi-stage accumulator 101.

In FIG. 1, a shut-off valve 36, a flow rate adjustment valve 33, a flowmeter 37, a cooler 32 (precooler), a shut-off valve 38, an emergency detachment coupler 41, and a control circuit 43 are disposed in the dispenser 30. Further, a nozzle 44 extending to the outside of the dispenser 30 is disposed in the dispenser 30. The dispenser 30 sends hydrogen gas (hydrogen fuel) supplied from the multi-stage accumulator 101 to the cooler 32 via the shut-off valve 36, the flow rate adjustment valve 33, and the flowmeter 37. At that time, a flow rate of the hydrogen fuel supplied from the multi-stage accumulator 101 per unit time is controlled by the flow rate adjustment valve 33, and is measured by the flowmeter 37. Then, the hydrogen fuel is cooled to, for example, −40° C. by the cooler 32. The cooled hydrogen fuel passes through the shut-off valve 38, the emergency detachment coupler 41, and the nozzle 44, and a fuel tank 202 mounted on an FCV 200 is filled with the hydrogen fuel by using a differential pressure. Further, a refrigerant cooled by the refrigerator 42 is circulated in the cooler 32 by a circulation pump (not shown). Further, the control circuit 43 is configured to be able to communicate with an on-board device 204 in the FCV 200 (fuel cell vehicle (FCV) powered by the hydrogen fuel) that has arrived at the hydrogen station 102. For example, the control circuit 43 is configured to be able to perform wireless communication using infrared rays. Further, the control circuit 43 is connected to the control circuit 100 that controls the entire hydrogen filling system 500.

Further, in the hydrogen filling system 500 in FIG. 1, a plurality of pressure gauges are disposed at different positions in a flow passage of the hydrogen fuel between the multi-stage accumulator 101 and an outlet of the dispenser 30. Specifically, a pressure in the accumulator 10 is measured by a pressure gauge 11. A pressure in the accumulator 12 is measured by a pressure gauge 13. A pressure in the accumulator 14 is measured by a pressure gauge 15. Further, in the dispenser 30, a pressure near an inlet of the dispenser 30 supplied to the dispenser 30 is measured by a pressure gauge 27. Further, a pressure near the outlet of the dispenser 30 is measured by a pressure gauge 28. In the example of FIG. 1, the pressure gauge 27 measures a pressure of the upstream side (primary side) of the shut-off valve 36 located on the primary side of the cooler 32. The pressure gauge 28 measures a pressure near the emergency detachment coupler 41 on the secondary side of the cooler 32. Pressure data measured by each pressure gauge is output to the control circuit 100 at all times or at a predetermined sampling cycle (for example, 10 msec to several seconds). In other words, the control circuit 100 monitors the pressure measured by each pressure gauge at all times or at a predetermined sampling cycle (for example, 10 msec to several seconds). Further, a pressure of the fuel tank 202 mounted on the FCV 200 is measured by a pressure gauge 206 mounted on the FCV 200. As will be described later, the pressure of the fuel tank 202 mounted on the FCV 200 is monitored at all times or at predetermined sampling intervals (for example, 10 msec to several seconds) while the communication between the on-board device 204 and the control circuit 43 is established.

Further, in the dispenser 30, a temperature near the outlet of the dispenser 30 of the hydrogen gas supplied to the FCV 200 is measured by a thermometer 29. The thermometer 29 is on the secondary side of the cooler 32, and measures a temperature near the emergency detachment coupler 41, for example. Further, an outside air temperature near the dispenser 30 is measured by a thermometer 31. Temperature data measured by each thermometer is output to the control circuit 100 at all times or at a predetermined sampling cycle (for example, 10 msec to several tens of seconds). In other words, the control circuit 100 monitors the temperature measured by each thermometer at all times or at a predetermined sampling cycle (for example, 10 msec to several tens of seconds). Further, a temperature of the fuel tank 202 mounted on the FCV 200 is measured by a thermometer 207 mounted on the FCV 200. As will be described later, the temperature of the fuel tank 202 mounted on the FCV 200 is monitored at all times or at predetermined sampling intervals (for example, 10 msec to several seconds) while the communication between the on-board device 204 and the control circuit 43 is established.

In a state where the hydrogen gas accumulated in the curdle, the intermediate accumulator, or the tank of the hydrogen trailer is decompressed to a low pressure (for example, 0.6 MPa) by each regulator (not shown) controlled by the control circuit 100, the hydrogen gas is supplied to the suction side of the compressor 40. Similarly, the hydrogen gas produced by the hydrogen production apparatus is supplied to the suction side of the compressor 40 at a low pressure (for example, 0.6 MPa). Under the control of the control circuit 100, the compressor 40 supplies the hydrogen gas supplied at low pressure to the accumulators 10, 12, and 14 of the multi-stage accumulator 101 while compressing the hydrogen gas. The compressor 40 performs compression until the internal pressure of each of the accumulators 10, 12, and 14 of the multi-stage accumulator 101 becomes a predetermined high pressure (for example, 82 MPa). In other words, the compressor 40 performs compression until a secondary side pressure $P_{OUT}$ of the discharge side becomes a predetermined high pressure (for example, 82 MPa). Whether a partner supplying the hydrogen gas to the suction side of the compressor 40 is the curdle, the intermediate accumulator, the hydrogen trailer, or the hydrogen production apparatus may be determined by control of the control circuit 100. Similarly, whether a partner to which the compressor 40 supplies the hydrogen gas is the accumulator 10, 12, or 14 may be determined by controlling opening/closing of the corresponding valves 21, 23, and 25 disposed on the respective pipes by the control circuit 100. Alternatively, control may be performed so that the hydrogen gas is supplied to two or more accumulators at the same time.

In the example described above, the case where control is performed so that a pressure PIN for supplying the hydrogen gas to the suction side of the compressor 40 is reduced to a predetermined low pressure (for example, 0.6 MPa) has been shown. However, the present invention is not limited thereto. The hydrogen gas accumulated in the curdle, the intermediate accumulator, or the hydrogen trailer may be supplied to the suction side of the compressor 40 without reducing the pressure or at a pressure higher than a predetermined low pressure (for example, 0.6 MPa), and may be compressed.

The hydrogen gas accumulated in the multi-stage accumulator 101 is cooled by the cooler 32 in the dispenser 30 and is supplied from the dispenser 30 to the FCV 200 arriving at the inside of the hydrogen station 102.

Figure 2:
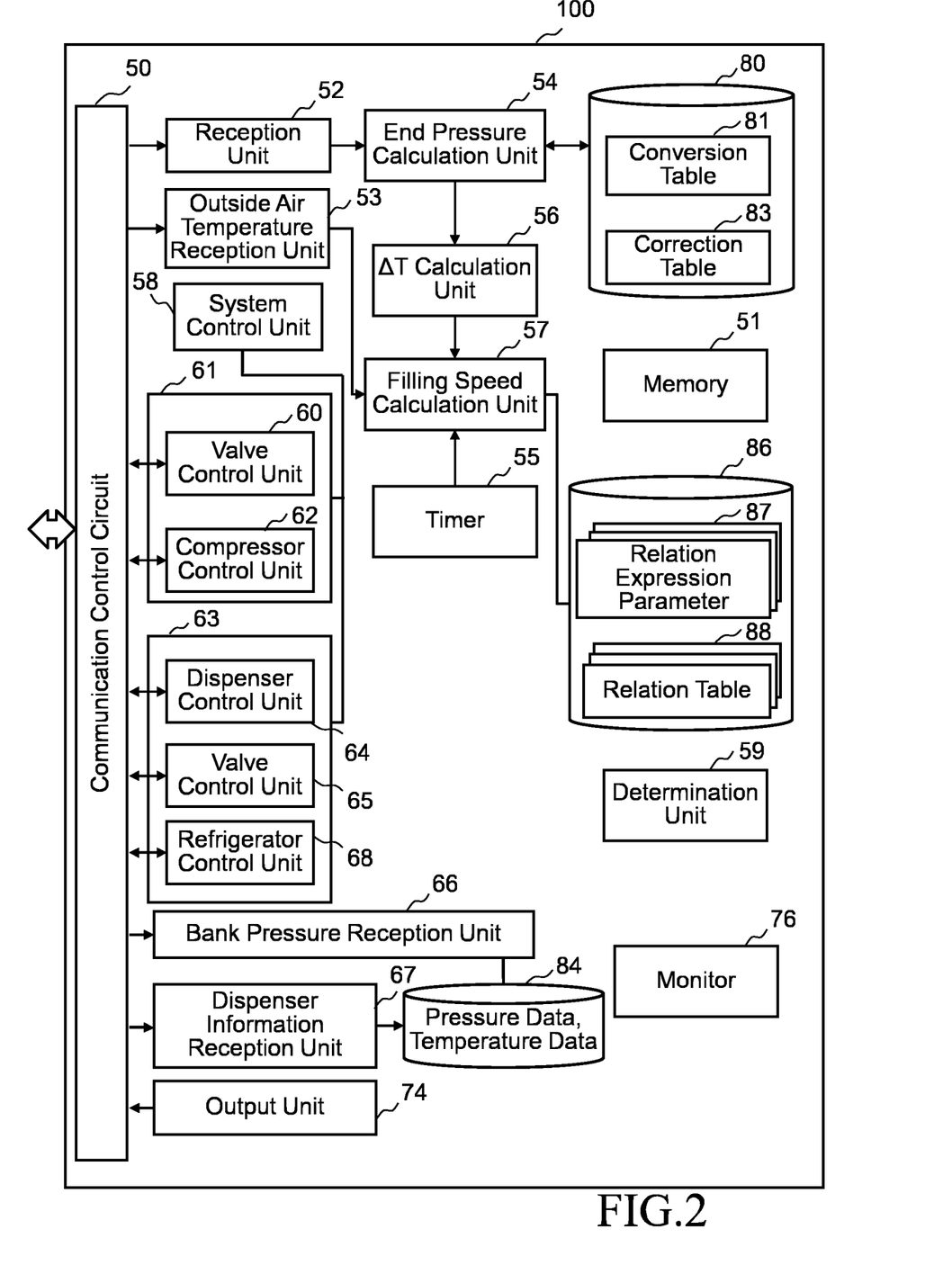
FIG. 2 is a configuration diagram showing an example of an internal configuration of a control circuit that controls the entire hydrogen filling system in First embodiment.

FIG. 2 is a configuration diagram showing an example of an internal configuration of the control circuit that controls the entire hydrogen filling system in the first embodiment. In FIG. 2, a communication control circuit 50, a memory 51, a reception unit 52, an outside air temperature reception unit 53, an end pressure calculation unit 54, a timer 55, a temperature difference calculation unit 56, a filling speed calculation unit 57, a system control unit 58, a determination unit 59, a pressure recovery control unit 61, a supply control unit 63, a bank pressure reception unit 66, dispenser information reception unit 67, an output unit 74, a monitor 76, and storage devices 80, 84, and 86 such as magnetic disk devices are disposed in the control circuit 100. The pressure recovery control unit 61 has a valve control unit 60 and a compressor control unit 62. The supply control unit 63 has a dispenser control unit 64, a valve control unit 65, and a refrigerator control unit 68. Each "unit" such as the reception unit 52, the outside air temperature reception unit 53, the end pressure calculation unit 54, the timer 55, the temperature difference calculation unit 56, the filling speed calculation unit 57, the system control unit 58, the determination unit 59, the pressure recovery control unit 61 (the valve control unit 60 and the compressor control unit 62), the supply control unit 63 (the dispenser control unit 64, the valve control unit 65, and the refrigerator control unit 68), the bank pressure reception unit 66, the dispenser information reception unit 67, and the output unit 74 includes a processing circuit, and an electric circuit, a computer, a processor, a circuit board, a semiconductor device or the like is included in the processing circuit. Further, a common processing circuit (same processing circuit) may be used for each "unit". Alternatively, a different processing circuit (separate processing circuit) may be used. Input data required in the reception unit 52, the outside air temperature reception unit 53, the end pressure calculation unit 54, the timer 55, the temperature difference calculation unit 56, the filling speed calculation unit 57, the system control unit 58, the determination unit 59, the pressure recovery control unit 61 (the valve control unit 60 and the compressor control unit 62), the supply control unit 63 (the dispenser control unit 64, the valve control unit 65, and the refrigerator control unit 68), the bank pressure reception unit 66, the dispenser information reception unit 67, and the output unit 74, or calculated results are stored in the memory 51 each time.

Further, a conversion table 81 showing a correlation between FCV information such as the pressure, the temperature, and the volume of the fuel tank 202 mounted on the FCV 200, a remaining amount of the hydrogen gas corresponding to the FCV information, and filling information such as a final pressure and a final temperature for filling the fuel tank 202 with the hydrogen gas is stored in the storage device 80. Further, a correction table 83 for correcting a result obtained from the conversion table 81 is stored in the storage device 80.

Further, a relation expression parameter 87 between a difference ΔT between a maximum allowable temperature Tmax of the fuel tank 202 and an initial temperature Ti of the fuel tank 202 and a filling speed M is stored in a storage device 86. Further, a relation table 88 between the difference ΔT between the maximum allowable temperature Tmax of the fuel tank 202 and the initial temperature Ti of the fuel tank 202, and the filling speed M is stored in the storage device 86. The relation expression parameter 87 and the relation table 88 are created for each hydrogen gas supply temperature. Further, the relation expression parameter is created depending on an initial pressure Pa of the fuel tank 202. Further, the relation expression parameter is created depending on an outside air temperature T'. In the example of FIG. 2, a case where both the relation expression parameter 87 and the relation table 88 are stored is shown, but only one of them may be stored.

Further, the bank pressure reception unit 66 receives the pressure measured by each of the pressure gauges 11, 13, and 15 at all times or at a predetermined sampling cycle (for example, 10 msec to several seconds), and stores the pressure in the storage device 84 together with a reception time. Similarly, the dispenser information reception unit 67 receives the pressure measured by each of the pressure gauges 27 and 28 in the dispenser 30 at all times or at a predetermined sampling cycle (for example, 10 msec to several seconds), and stores the pressure in the storage device 84 together with a reception time. Further, the dispenser information reception unit 67 receives the temperature measured by the thermometer 29 in the dispenser 30 at all times or at a predetermined sampling cycle (for example, 10 msec to several seconds), and stores the temperature in the storage device 84 together with the reception time.

As described above, conventionally, in the case of filling the hydrogen gas at the hydrogen station 102, a filling time until full filling is estimated by a simulation with a large margin in advance for an actual temperature increase of the fuel tank 202 so that the temperature of the fuel tank 202 of the FCV 200 does not become a high temperature, by using the hydrogen gas that is cooled enough to prevent the supply temperature of the hydrogen gas from increasing. Then, a filling speed is determined according to the estimated filling time. Therefore, the determined filling speed is generally set lower as compared with the actual filling capacity of the hydrogen station 102. Therefore, in the first embodiment, a correlation between a difference between a maximum allowable temperature of the fuel tank 202 and an initial temperature of the fuel tank 202, and a filling speed is calculated on the basis of data when the hydrogen gas is actually filled into the fuel tank 202 of the FCV 200 at the hydrogen station 102, and the filling speed is determined according to the correlation. Hereinafter, it will be specifically described.

Figure 3:
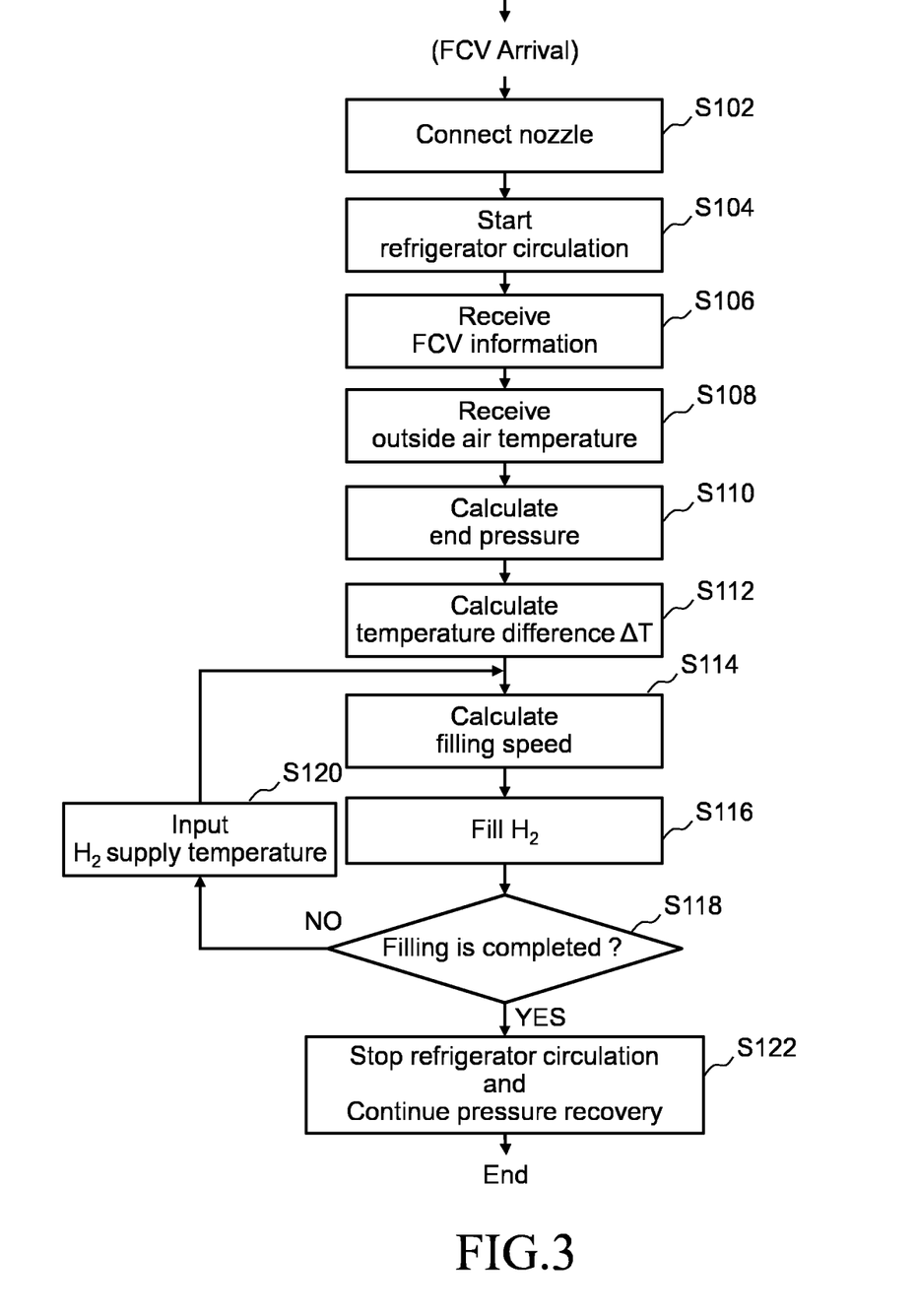
FIG. 3 is a flowchart showing main steps of a hydrogen filling method in the first embodiment.

FIG. 3 is a flowchart showing main steps of a hydrogen filling method in the first embodiment. In FIG. 3, the hydrogen filling method in the first embodiment executes a series of steps such as a nozzle connection step (S102), a refrigerator circulation start step (S104), an FCV information reception step (S106), an outside air temperature reception step (S108), an end pressure calculation step (S110), a temperature difference calculation step (S112), a filling speed calculation step (S114), a hydrogen filling step (S116), a determination step (S118), a hydrogen supply temperature input step (S120), and a refrigerator circulation stop and pressure recovery continuation step (S122).

As the nozzle connection step (S102), when the FCV 200 arrives at the hydrogen station 102, a worker of the hydrogen station 102 or a user of the FCV 200 connects (fits) the nozzle 44 of the dispenser 30 to a reception port (receptacle) of the fuel tank 202 of the FCV 200, and fixes the nozzle 44. When the FCV 200 arrives at the inside of the hydrogen station 102 and the nozzle 44 of the dispenser 30 is connected and fixed to the reception port (receptacle) of the fuel tank 202 of the FCV 200 by the user or the worker of the hydrogen station 102, communication between the on-board device 204 and the control circuit 43 (relay device) is established.

As the refrigerator circulation start step (S104), when the communication between the on-board device 204 and the control circuit 43 (relay device) is established, the refrigerator control unit 68 in the control circuit 100 controls the refrigerator 42 via the communication control circuit 50 and drives a circulation pump of the refrigerator 42. In this way, the circulation of the refrigerant between the refrigerator 42 and the cooler 32 is started. As a result, cooling of the hydrogen gas is started by the cooler 32 in the dispenser 30. As described above, the hydrogen gas is cooled by the cooler 32 disposed in the dispenser 30. However, in the first embodiment, when the filling of the hydrogen gas into the fuel tank 202 is started, cooling of the hydrogen gas is started by the cooler 32 in the dispenser 30, and the circulation of the refrigerant is stopped when the filling of the hydrogen gas into the fuel tank 202 is completed, as described later. As described above, conventionally, the circulation pump that is constantly driven by the constant circulation is stopped during a period in which the hydrogen gas is not filled. As a result, it is possible to reduce the consumption of an amount of electric power for driving the circulation pump, which has occurred during the period in which the hydrogen gas is not filled.

As the FCV information reception step (S106), the reception unit 52 receives the temperature (initial temperature) Ti of the fuel tank 202 before the start of filling from the FCV 200 (fuel cell vehicle: FCV) equipped with the fuel tank 202 filled with the hydrogen gas and powered by the hydrogen gas. Further, when the reception unit 52 receives the temperature Ti of the fuel tank 202 before the start of filling, the reception unit 52 also receives the pressure (initial pressure) Pa of the fuel tank 202 before the start of filling. Specifically, the reception unit 52 receives FCV information regarding the fuel tank 202 (hydrogen storage container) mounted on the FCV 200 from the on-board device 204 mounted on the FCV 200 (fuel cell vehicle (FCV)) powered by the hydrogen gas. Specifically, the following operation is performed. When the communication between the on-board device 204 and the control circuit 43 (relay device) is established, the FCV information such as the present pressure and temperature of the fuel tank 202 and the volume of the fuel tank 202 is output (transmitted) in real time from the on-board device 204. The FCV information is relayed by the control circuit 43 and transmitted to the control circuit 100. In the control circuit 100, the reception unit 52 receives the FCV information via the communication control circuit 50. The FCV information is monitored at all times or at predetermined sampling intervals (for example, 10 msec to several seconds) while the communication between the on-board device 204 and the control circuit 43 is established. The received FCV information is stored in the storage device 80 together with reception time information.

As the outside air temperature reception step (S108), the outside air temperature reception unit 53 receives the outside air temperature T' measured by the thermometer 31 via the communication control circuit 50. The received information on the outside air temperature T' is stored in the storage device 80 together with reception time information.

As the end pressure calculation step (S110), the end pressure calculation unit 54 reads the conversion table 81 from the storage device 80, and calculates and predicts a final pressure PF corresponding to the pressure Pa, temperature Ti, and volume V of the fuel tank 202 at the time of initial reception and the outside air temperature T', which have been received. Further, the end pressure calculation unit 54 reads the correction table 83 from the storage device 80, and corrects a numerical value obtained by the conversion table 81. When only data of the conversion table 81 has a large error in an obtained result, the correction table 83 may be provided on the basis of a result obtained by an experiment, a simulation or the like. The calculated final pressure PF is output to the system control unit 58.

In the temperature difference calculation step (S112), the temperature difference calculation unit 56 calculates a difference $\Delta T$ (=Tmax−Ti) between the preset maximum temperature Tmax and the temperature (initial temperature) Ti of the fuel tank 202. For example, 85° C. is preset as the maximum temperature Tmax allowed in the fuel tank 202. When the received temperature (initial temperature) Ti of the fuel tank 202 before filling is, for example, 15° C., the difference $\Delta T=85-15=70°$ C. is calculated.

Figure 4:
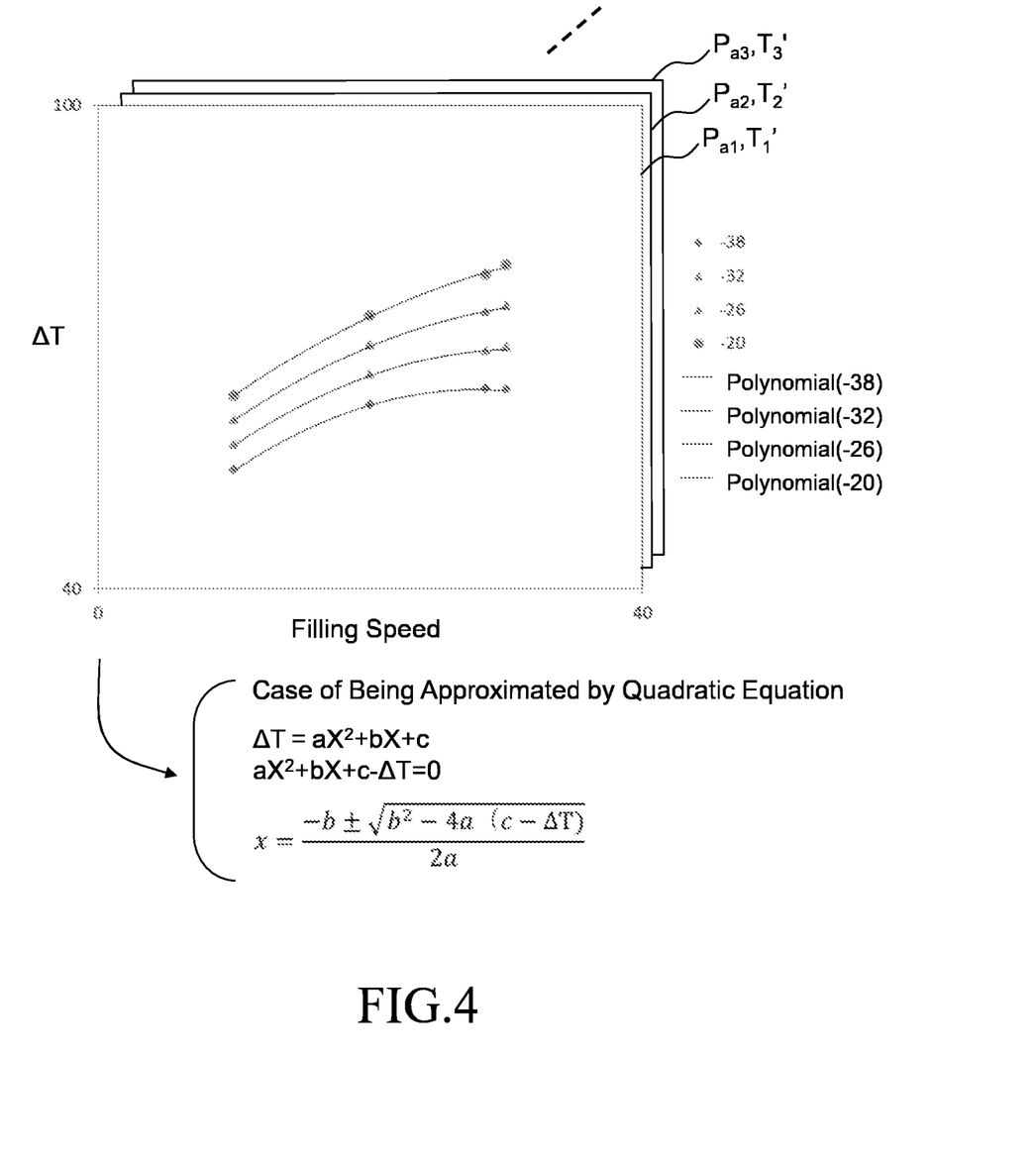
FIG. 4 is a diagram showing an example of a correlation between a temperature increase change of a fuel tank and a filling speed in the first embodiment.

FIG. 4 is a diagram showing an example of a correlation between the temperature increase change of the fuel tank and the filling speed in the first embodiment. In FIG. 4, a vertical axis indicates the difference $\Delta T$ (° C.) between the preset maximum temperature Tmax and the temperature (initial temperature) Ti of the fuel tank 202 as the temperature increase change. A horizontal axis indicates the filling speed M (MPa/min). Further, the correlation is created for each hydrogen gas supply temperature. Furthermore, the correlation depends on the pressure (initial pressure) Pa before the start of filling of the fuel tank 202 and the outside air temperature T'. Therefore, the correlation is created for each combination of the initial pressure Pa of the fuel tank 202 and the outside air temperature T' and for each hydrogen gas supply temperature. In the example of FIG. 4, correlations are shown for hydrogen gas supply temperatures of −20° C., −26° C., −32° C., and −38° C. The correlation is created on the basis of data when the hydrogen gas is actually filled at the hydrogen station 102. Therefore, a conventional margin is not included in the correlation. In the example of FIG. 4, a graph in which a plotted relation is approximated by a quadratic polynomial is shown.

Figure 5:
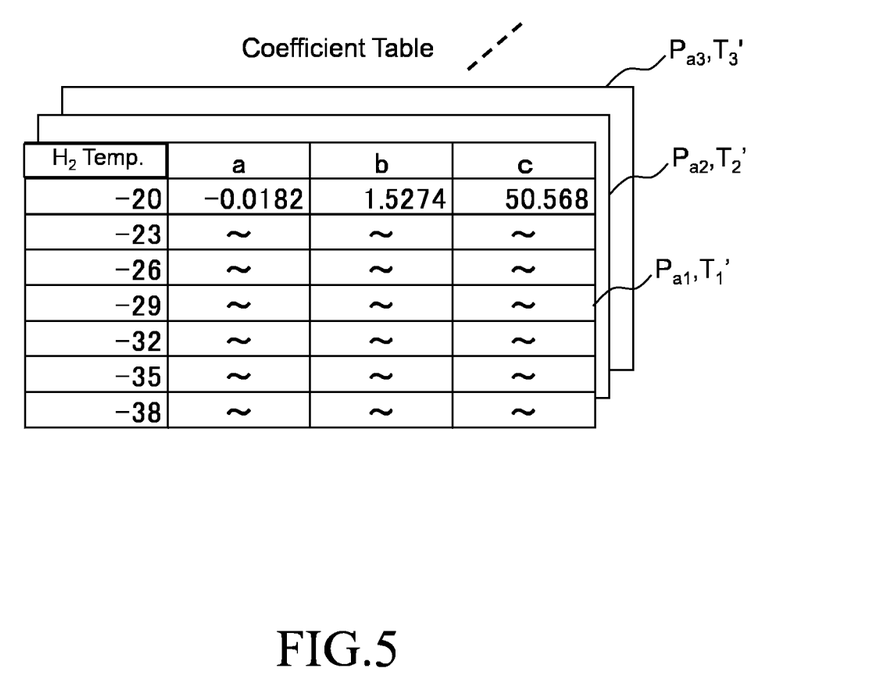
FIG. 5 is a diagram illustrating a coefficient table of a quadratic polynomial when the correlation between the temperature increase change of the fuel tank and the filling speed is approximated by the quadratic polynomial in the first embodiment.

FIG. 5 is a diagram illustrating a coefficient table of a quadratic polynomial when the correlation between the temperature increase change of the fuel tank and the filling speed is approximated by the quadratic polynomial in the first embodiment. In FIG. 5, values of coefficients a, b, and c of the quadratic polynomial described in FIG. 4 are defined for each hydrogen gas supply temperature. In the example of FIG. 5, a case where the coefficients a, b, and c of the quadratic polynomial are defined for hydrogen gas supply temperatures of −20° C., −23° C., −26° C., −29° C., −32° C., −35° C., and −38° C. is shown. Hydrogen gas supply temperatures that are not shown in the correlation equation of FIG. 4 may be obtained by linear interpolation. Further, when hydrogen gas supply temperatures at the time of actual calculation are not defined, linearly interpolated values may be used. The correlation between the difference between the maximum allowable temperature and the initial temperature of the fuel tank, and the filling speed is not limited to the quadratic equation. The correlation may be approximated by equations of other orders.

Figure 6:
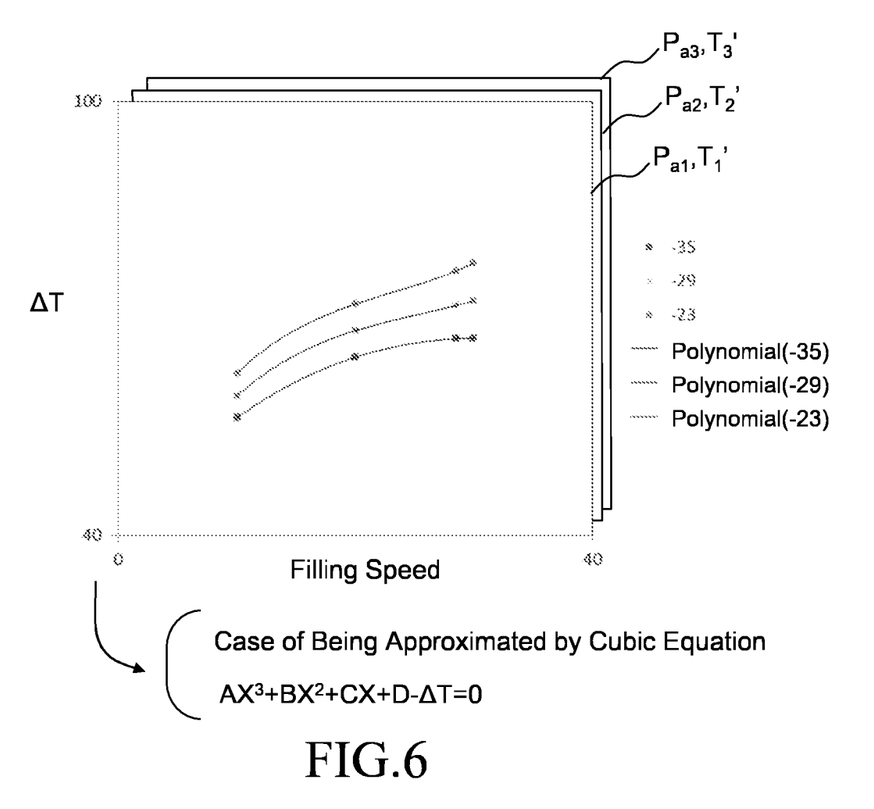
FIG. 6 is a diagram showing another example of the correlation between the temperature increase change of the fuel tank and the filling speed in the first embodiment.

FIG. 6 is a diagram showing another example of the correlation between the temperature increase change of the fuel tank and the filling speed in the first embodiment. In FIG. 6, a vertical axis indicates the difference $\Delta T$ (° C.) between the preset maximum temperature Tmax and the temperature (initial temperature) Ti of the fuel tank 202 as the temperature increase change. A horizontal axis indicates the filling speed M (MPa/min). Further, the correlation is created for each hydrogen gas supply temperature, similarly to the case shown in FIG. 4. Furthermore, the correlation depends on the pressure (initial pressure) Pa before the start of filling of the fuel tank 202 and the outside air temperature T', similarly to the case shown in FIG. 4. Therefore, the correlation is created for each combination of the initial pressure Pa of the fuel tank 202 and the outside air temperature T' and for each hydrogen gas supply temperature. In the example of FIG. 6, correlations are shown for hydrogen gas supply temperatures of −23° C., −29° C., and −35° C. The correlation is created on the basis of data when the hydrogen gas is actually filled at the hydrogen station 102. Therefore, a conventional margin is not included in the correlation. In the example of FIG. 6, a graph in which a plotted relation is approximated by a cubic polynomial is shown.

Figure 7:
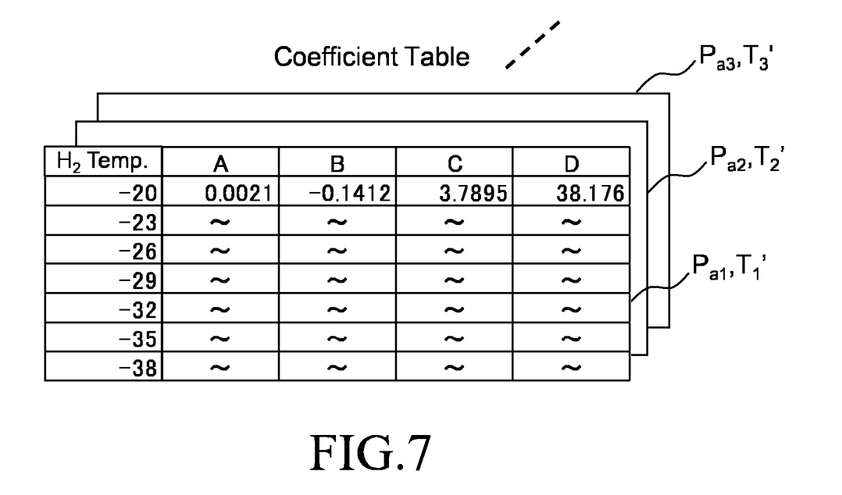
FIG. 7 is a diagram illustrating a coefficient table of a cubic polynomial when the correlation between the temperature increase change of the fuel tank and the filling speed is approximated by the cubic polynomial in the first embodiment.

FIG. 7 is a diagram illustrating a coefficient table of a cubic polynomial when the correlation between the temperature increase change of the fuel tank and the filling speed is approximated by the cubic polynomial in the first embodiment. In FIG. 7, values of coefficients A, B, C, and D of the cubic polynomial described in FIG. 6 are defined for each hydrogen gas supply temperature. In the example of FIG. 7, a case where the coefficients A, B, C, and D of the cubic polynomial are defined for hydrogen gas supply temperatures of −20° C., −23° C., −26° C., −29° C., −32° C., −35° C., and −38° C. is shown. Hydrogen gas supply temperatures that are not shown in the correlation equation of FIG. 6 may be obtained by linear interpolation. Further, when hydrogen gas supply temperatures at the time of actual calculation are not defined, linearly interpolated values may be used.

In FIGS. 4 to 7, the relation expression between the temperature increase change of the fuel tank 202 and the filling speed is shown, but the relation may be defined as a relation table instead of the coefficient table. The relation table may also be created for each combination of the initial pressure Pa of the fuel tank 202 and the outside air temperature T' and for each hydrogen gas supply temperature.

As the filling speed calculation step (S114), the filling speed calculation unit 57 calculates the filling speed M of the hydrogen gas that depends on the difference $\Delta T$. The filling speed M is calculated by using the above-described relation expression or relation table between the temperature increase change of the tank depending on the supply temperature of the hydrogen gas supplied via the dispenser 30 and the filling speed. Specifically, first, a coefficient table or a relation table of a relation expression corresponding to the initial pressure Pa of the fuel tank 202, the outside air temperature T', and the preset hydrogen gas supply temperature T" is read from the storage device 86. Since the refrigerant is not supplied from the refrigerator 42 to the cooler 32 before the start of filling, the hydrogen gas is not always sufficiently cooled. Therefore, the initial value T" of the hydrogen gas supply temperature may be preset. For example, the initial value T"=−20° C. is set. When the circulation of the refrigerant is started, the hydrogen gas is cooled in a short period. For example, it is cooled in several tens of seconds. For this reason, until then, a temporary filling speed may be calculated with the initial value T". Therefore, the filling speed calculation unit 57 calculates the filling speed M corresponding to the calculated difference $\Delta T$ by referring to the coefficient table or the relation table of the read relation expression. The calculated filling speed M is output to the system control unit 58.

As the hydrogen filling step (S116), the hydrogen gas is filled into the fuel tank 202 at the calculated filling speed M from the multi-stage accumulator 101 (accumulator) in which the hydrogen gas has been accumulated via the dispenser 30. In other words, the dispenser 30 fills the fuel tank 202 with the hydrogen gas at the calculated filling speed M from the multi-stage accumulator 101 (accumulator).

Figure 8:
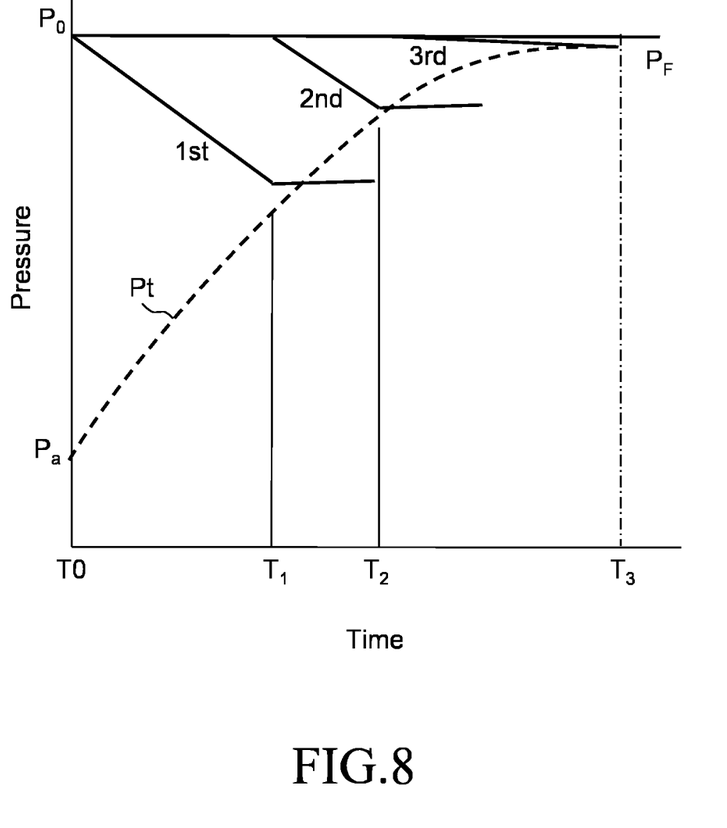
FIG. 8 is a diagram illustrating a filling method in a case of performing differential pressure filling of hydrogen fuel by using a multi-stage accumulator in the first embodiment.

FIG. 8 is a diagram illustrating a filling method in a case of performing differential pressure filling of the hydrogen fuel by using the multi-stage accumulator in the first embodiment. In FIG. 8, a vertical axis indicates a pressure and a horizontal axis indicates a time. In the case of performing the differential pressure filling of the hydrogen fuel on the FCV 200, generally, the hydrogen fuel is accumulated in the accumulators 10, 12, and 14 of the multi-stage accumulator 101 in advance at the same pressure P0 (for example, 82 MPa). On the other hand, the pressure of the fuel tank 202 of the FCV 200 that has arrived at the hydrogen station 102 becomes a pressure Pa. A case where filling starts for the fuel tank 202 of the FCV 200 from the above state will be described.

First, the filling starts from the 1st bank, for example, the accumulator 10 to the fuel tank 202. Specifically, the following operation is performed. Under the control of the system control unit 58, the supply control unit 63 controls the supply unit 106, and supplies the hydrogen fuel from the accumulator 10 to the fuel tank 202 of the FCV 200. Specifically, the system control unit 58 controls the dispenser control unit 64 and the valve control unit 65. The dispenser control unit 64 communicates with the control circuit 43 of the dispenser 30 via the communication control circuit 50, and controls the operation of the dispenser 30. Specifically, first, the control circuit 43 adjusts the opening of the flow rate adjustment valve in the dispenser 30 so that a filling speed becomes the calculated filling speed M. Next, the control circuit 43 opens the shut-off valves 36 and 38 in the dispenser 30. Then, the valve control unit 65 outputs a control signal to the valves 22, 24, and 26 via the communication control circuit 50, and controls opening/closing of each valve. Specifically, the valve 22 is opened and the valves 24 and 26 are kept closed. As a result, the hydrogen fuel is supplied from the accumulator 10 to the fuel tank 202. By the differential pressure between the accumulator 10 and the fuel tank 202, the hydrogen fuel accumulated in the accumulator 10 moves to the side of the fuel tank 202 at the adjusted filling speed, and the pressure of the fuel tank 202 gradually increases as indicated by a dotted line Pt. Accordingly, the pressure (graph indicated by "1st") of the accumulator 10 gradually decreases. Then, at a point of time when a pressure falls outside a use lower limit pressure of the 1st bank and a time T1 elapses from the start of filling, an accumulator to be used is switched from the accumulator 10 to the 2nd bank, for example, the accumulator 12. Specifically, the valve control unit 65 outputs a control signal to the valves 22, 24, and 26 via the communication control circuit 50, and controls opening/closing of each valve. Specifically, the valve 24 is opened, the valve 22 is closed, and the valve 26 is kept closed. As a result, since the differential pressure between the accumulator 12 and the fuel tank 202 increases, the filling speed can be kept high.

Then, by the differential pressure between the 2nd bank, for example, the accumulator 12 and the fuel tank 202, the hydrogen fuel accumulated in the accumulator 12 moves to the side of the fuel tank 202 at the same adjusted filling speed, and the pressure of the fuel tank 202 gradually increases as indicated by the dotted line Pt. Accordingly, the pressure (graph indicated by "2nd") of the accumulator 12 gradually decreases. Then, at a point of time when a pressure falls outside a use lower limit pressure of the 2nd bank and a time T2 elapses from the start of filling, an accumulator to be used is switched from the accumulator 12 to the 3rd bank, for example, the accumulator 14. Specifically, the valve control unit 65 outputs a control signal to the valves 22, 24, and 26 via the communication control circuit 50, and controls opening/closing of each valve. Specifically, the valve 26 is opened, the valve 24 is closed, and the valve 22 is kept closed. As a result, since the differential pressure between the accumulator 14 and the fuel tank 202 increases, the filling speed can be kept high.

Then, by the differential pressure between the 3rd bank, for example, the accumulator 14 and the fuel tank 202, the hydrogen fuel accumulated in the accumulator 14 moves to the side of the fuel tank 202 at the adjusted filling speed, and the pressure of the fuel tank 202 gradually increases as indicated by the dotted line Pt. Accordingly, the pressure (graph indicated by "3rd") of the accumulator 14 gradually decreases. Then, filling is performed until the pressure of the fuel tank 202 becomes the calculated final pressure PF (for example, 65 to 81 MPa) by the accumulator 14 to be the 3rd bank.

As described above, the fuel tank 202 is filled with the hydrogen gas in order from the 1st bank. As long as the hydrogen gas is filled at the calculated filling speed M, the temperature of the fuel tank 202 increases only to the maximum temperature Tmax even if it increases from the temperature (initial temperature) Ti of the fuel tank 202. In other words, the temperature of the fuel tank 202 does not exceed the maximum temperature Tmax as long as the hydrogen gas is filled at the calculated filling speed M. However, such a relation holds unless the hydrogen gas supply temperature changes. For the outside air temperature, a change during a filling period of about several minutes may be regarded as an error level. Therefore, the filling speed M is reviewed on a regular basis.

As the determination step (S118), the determination unit 59 determines whether the filling has been completed. Specifically, the determination unit 59 determines whether the pressure in the fuel tank 202 has reached the calculated final pressure PF each time the time set in the timer 55 has elapsed. When the filling has been completed, the process proceeds to the refrigerator circulation stop step (S122) and the pressure recovery step (S124). When the filling has not been completed yet, the process proceeds to the hydrogen supply temperature input step (S120). The time set in the timer 55 is set to several tens of seconds (for example, 30 seconds) for the first filling immediately after the start of filling, and is set to several seconds (for example, 5 seconds) for the second and subsequent fillings. In the first embodiment, since the refrigerant is circulated from the refrigerator 42 to the cooler 32 each time the hydrogen gas is filled, the cooling of the hydrogen gas at the start of filling may be insufficient. Therefore, the time in the first filling is preferably set longer than the times in the second and subsequent fillings by considering a time required for cooling the hydrogen gas by the cooler 32.

As the hydrogen supply temperature input step (S120), the filling speed calculation unit 57 inputs the present hydrogen supply temperature. Specifically, the latest temperature measured by the thermometer 29 stored in the storage device 84 is input as the latest hydrogen supply temperature. Then, the process returns to the filling speed calculation step (S114), and the steps from the filling speed calculation step (S114) to the hydrogen supply temperature input step (S120) are repeated until the filling is completed.

In the filling speed calculation step (S114), the filling speed calculation unit 57 reads, from the storage device 86, a coefficient table or a relation table of a relation expression corresponding to the latest hydrogen supply temperature, the measured outside air temperature T', and the obtained initial pressure Pa of the fuel tank 202. Then, the filling speed calculation unit 57 refers to the read coefficient table or relation table of the relation expression, and recalculates the filling speed M corresponding to the calculated difference $\Delta T$. Here, only the hydrogen supply temperature is changed, and the other parameters are used without being changed. Then, the calculated filling speed M is output to the system control unit 58. Then, each time the filling speed M is calculated, the opening of the flow rate adjustment valve 33 is readjusted so that a filling speed becomes the recalculated filling speed M. Then, each time the filling speed M is calculated, the hydrogen gas filling operation is continued at the readjusted filling speed M.

As the refrigerator circulation stop and pressure recovery continuation step (S122), when the filling is completed, the refrigerator control unit 68 controls the refrigerator 42 via the communication control circuit 50, and stops the circulation pump of the refrigerator 42. In this way, the circulation of the refrigerant between the refrigerator 42 and the cooler 32 is stopped. As a result, the cooling of the hydrogen gas by the cooler 32 in the dispenser 30 is stopped or the cooling speed is reduced. In the first embodiment, since the filling speed M corresponding to the actual temperature difference $\Delta T$ depending on the actual hydrogen supply temperature, the actual outside air temperature, and the actual initial pressure is used, it is possible to cope with the change in the hydrogen supply temperature. For this reason, it is possible to eliminate the need to cool the hydrogen gas excessively by the cooler 32 constantly. Therefore, the circulation pump that is constantly driven by the constant circulation in the past can be stopped during a period in which the hydrogen gas is not filled. As a result, it is possible to reduce electric power for driving the circulation pump, which has occurred during the period in which the hydrogen gas is not filled.

In the above-described example, cooling of the hydrogen gas is started by the cooler 32 in the dispenser 30 when the filling of the hydrogen gas into the fuel tank 202 is started, and the circulation of the refrigerant is stopped when the filling of the hydrogen gas into the fuel tank 202 is completed. However, the present invention is not limited thereto. The circulation amount of the refrigerant to the cooler 32 may be increased when the filling of the hydrogen gas into the fuel tank 202 is started, and the circulation amount of the refrigerant may be reduced when the filling of the hydrogen gas into the fuel tank 202 is completed. Even with such a configuration, the electric power for driving the circulation pump can be reduced.

Further, the pressure recovery mechanism 104 recovers the pressure of each of the accumulators 10, 12, and 14. The compressor 40 and the valves 21, 23, and 25 configure the pressure recovery mechanism 104. First, the system control unit 58 selects a supply source of the hydrogen fuel to be connected to the suction side of the compressor 40 from the curdle, the intermediate accumulator, the hydrogen trailer, or the hydrogen production apparatus (not shown). Then, under the control of the system control unit 58, the pressure recovery control unit 61 controls the pressure recovery mechanism 104, and recovers the pressure of each of the accumulators 10, 12, and 14. Specifically, the following operation is performed. In the accumulator of each bank used for filling the fuel tank 202 of the FCV 200, the pressure may also be recovered during filling. However, since there is not enough time to recover the pressure to a prescribed pressure, the pressure should be recovered after filling. Since the 1st bank, the 2nd bank, and the 3rd bank are switched in this order, first, the pressure of the accumulator 10 to be the 1st bank is recovered. The valve control unit 60 opens the valve 21 from a state where the valves 21, 23, and 25 are closed.

Then, the compressor control unit 62 drives the compressor 40, sends the hydrogen fuel of the low pressure (for example, 0.6 MPa) from the supply source of the hydrogen fuel while compressing the hydrogen fuel, and fills the accumulator 10 with the hydrogen fuel until the pressure of the accumulator 10 becomes a predetermined pressure P0 (for example, 82 MPa), thereby recovering the pressure of the accumulator 10.

Next, the valve control unit 60 closes the valve 21, and opens the valve 23 instead.

Then, the compressor control unit 62 drives the compressor 40, sends the hydrogen fuel of the low pressure (for example, 0.6 MPa) while compressing the hydrogen fuel, and fills the accumulator 12 with the hydrogen fuel until the pressure of the accumulator 12 becomes the predetermined pressure P0 (for example, 82 MPa), thereby recovering the pressure of the accumulator 12.

Next, the valve control unit 60 closes the valve 23, and opens the valve 25 instead.

Then, the compressor control unit 62 drives the compressor 40, sends the hydrogen fuel of the low pressure (for example, 0.6 MPa) while compressing the hydrogen fuel, and fills the accumulator 14 with the hydrogen fuel until the pressure of the accumulator 14 becomes the predetermined pressure P0 (for example, 82 MPa), thereby recovering the pressure of the accumulator 14.

In this way, even when the next FCV 200 arrives at the hydrogen station 102, the hydrogen fuel can be supplied similarly.

As described above, according to the first embodiment, when the hydrogen gas is filled, the hydrogen gas can be filled at the filling speed M where the extra margin is eliminated Therefore, a filling time can be shortened. Further, the circulation pump is stopped during the period when the hydrogen gas is not filled. As a result, it is possible to reduce electric power for driving the circulation pump, which has occurred during the period in which the hydrogen gas is not filled.

The embodiment has been described with reference to the specific examples. However, the present invention is not limited to these specific examples. For example, in the above-described examples, the case where the multi-stage accumulator 101 including the three accumulators 10, 12, and 14 is used to fill one FCV with the hydrogen fuel has been described. However, the present invention is not limited thereto. According to the volumes of the accumulators 10, 12, and 14 and the like, more accumulators may be used for filling of one FCV. Alternatively, two accumulators may be used for filling of one FCV.

Further, descriptions of parts and the like that are not directly necessary for explanation of the present invention, such as the device configuration and the control method, are omitted. However, the necessary device configuration and control method can be appropriately selected and used.

In addition, all hydrogen gas filling methods and hydrogen gas filling devices, which include the elements of the present invention and are capable of being appropriately changed in design by those skilled in the art, are included in the scope of the present invention.

What is claimed is:

1. A hydrogen gas filling device comprising:
   a reception circuit configured to receive, from a vehicle equipped with a tank to be filled with hydrogen gas and powered by the hydrogen gas, temperatures of the of the vehicle during the process of filling the tank with the hydrogen gas;
   a difference calculation circuit configured to calculate a plurality of differences at different times during the process of filling the tank with the hydrogen gas, the differences being differences between a preset and unchanging temperature and the temperature of the tank measured at different times during the process of filling the tank with hydrogen gas, the preset and unchanging temperature being the maximum allowable temperature of the tank;
   a filling speed calculation circuit configured to calculate a plurality of filling speeds of the hydrogen gas, each depending on a different calculated difference between the preset and unchanging temperature and the temperature of the tank measured at a different time during the process of filling the tank with hydrogen gas;
   an accumulator configured to accumulate hydrogen gas; and
   a filling machine configured to fill the tank with the hydrogen gas from the accumulator at the calculated filling speeds.

2. The device according to claim 1, wherein the temperature of the tank is obtained before a start of filling the tank with the hydrogen gas.

3. The device according to claim 1, further comprising:
   a storage device configured to store a plurality of correlations between the filling speeds and the differences only between the preset maximum allowable temperature and the temperatures of the tank at different times during the filling process.

4. The device according to claim 3, wherein the filling speed calculation circuit is configured to determine the filling speeds based on the stored correlations.

5. The device according to claim 1,
   wherein the device further comprises a storage device configured to store a plurality of correlations between the filling speeds of filling the tank with the hydrogen gas and a temperature difference between only the preset maximum allowable temperature and the received temperatures of the tank for each of a plurality of hydrogen gas supply temperatures at which the hydrogen gas is to be used to fill the tank by the accumulator, wherein the filling speed calculation circuit determines the filling speeds of the hydrogen gas depending on 1) the temperature differences between only the preset maximum allowable temperature and the received temperatures of the tank received from the vehicle at different times during the filling process, and 2) the hydrogen gas supply temperatures of hydrogen gas supplied by the accumulator to the tank, based on the stored correlations between the filling speeds and the temperature differences between only the preset maximum allowable temperature and the received temperatures of the tank received from the vehicle at different times during the filling process for each of the plurality of hydrogen gas supply temperatures at which the hydrogen gas is to be used to fill the tank by the accumulator.

6. The device according to claim 5,
wherein the filling speed calculation circuit is configured to determine a temporary filling speed of the hydrogen gas depending on the differences and the preset maximum allowable temperature, and
wherein the filling operation fills the hydrogen gas from the accumulator in which the hydrogen gas is accumulated into the tank at the temporary filling speed and thereafter at the filling speeds calculated by the filling speed calculation circuit.

7. The device according to claim 5, wherein the plurality of correlations are stored in a coefficient table in the storage device storing coefficients of a second-order-or-higher-order polynomial determining the relationship between the filling speeds and the temperature differences, wherein the values of the coefficients are defined for each of the stored plurality of hydrogen gas supply temperatures.

8. The device according to claim 5, wherein the plurality of correlations are generated on the basis of data collected when hydrogen gas actually fills the tank.

9. A hydrogen gas filling method comprising:
receiving, from a vehicle equipped with a tank to be filled with hydrogen gas and powered by the hydrogen gas, temperatures of the of the vehicle during the process of filling the tank with the hydrogen gas;
calculating a plurality of differences at different times during the process of filling the tank with the hydrogen gas, the differences being differences between a preset and unchanging temperature and the temperature of the tank measured at different times during the process of filling the tank with hydrogen gas, the preset and unchanging temperature being the maximum allowable temperature of the tank;
calculating a plurality of filling speeds of the hydrogen gas, each depending on a different calculated difference between the preset and unchanging temperature and the temperature of the tank measured at a different time during the process of filling the tank with hydrogen gas; and filling the tank with hydrogen gas from an accumulator in which the hydrogen gas is accumulated at the calculated filling speeds.

10. The method according to claim 9, wherein the temperature of the tank is obtained before a start of filling the tank with the hydrogen gas.

11. The method according to claim 9, further comprising:
storing a plurality of correlations between the filling speeds and the differences between only the preset maximum allowable temperature and the temperatures of the tank at different times during the filling process.

12. The method according to claim 11, wherein the calculating operation determines the filling speeds based on the stored correlations.

13. The method according to claim 9,
wherein the method further comprises storing a plurality of correlations between the filling speeds of filling the tank with the hydrogen gas and a temperature difference between only the preset maximum allowable temperature and the received temperatures of the tank for each of a plurality of hydrogen gas supply temperatures at which the hydrogen gas is to be used to fill the tank by the accumulator,
wherein the calculating operation determines the filling speeds of the hydrogen gas depending on 1) the temperature differences between only the preset maximum allowable temperature and the received temperatures of the tank received from the vehicle at different times during the filling process, and 2) the hydrogen gas supply temperatures of hydrogen gas supplied by the accumulator to the tank, based on the stored correlations between the filling speeds and the temperature differences between only the preset maximum allowable temperature and the received temperatures of the tank received from the vehicle at different times during the filling process for each of the plurality of hydrogen gas supply temperatures at which the hydrogen gas is to be used to fill the tank by the accumulator.

14. The method according to claim 13,
wherein the calculating operation determines a temporary filling speed of the hydrogen gas depending on the differences and the preset maximum allowable temperature, and
wherein the filling operation fills the hydrogen gas from the accumulator in which the hydrogen gas is accumulated into the tank at the temporary filling speed and thereafter at the filling speeds calculated by the calculating operation.

15. The method according to claim 13, wherein the plurality of correlations are stored in a coefficient table in the storage device storing coefficients of a second-order-or-higher-order polynomial determining the relationship between the filling speeds and the temperature differences, wherein the values of the coefficients are defined for each of the stored plurality of hydrogen gas supply temperatures.

16. The method according to claim 13, wherein the plurality of correlations are generated on the basis of data collected when hydrogen gas actually fills the tank.

* * * * *

UNITED STATES PATENT AND TRADEMARK OFFICE
CERTIFICATE OF CORRECTION

| | | |
|---|---|---|
| PATENT NO. | : 12,181,108 B2 | Page 1 of 1 |
| APPLICATION NO. | : 17/732049 | |
| DATED | : December 31, 2024 | |
| INVENTOR(S) | : A. Fukunaga et al. | |

It is certified that error appears in the above-identified patent and that said Letters Patent is hereby corrected as shown below:

On the Title Page

Item (57), Abstract, Line 3, please change "filing machine" to -- filling machine --

In the Claims

Column 14, Lines 29-30 (Claim 1) please change "of the of the" to -- of the --

Column 15, Line 46 (Claim 9) please change "of the of the" to -- of the --

Signed and Sealed this
Twenty-fourth Day of June, 2025

Coke Morgan Stewart
*Acting Director of the United States Patent and Trademark Office*